United States Patent [19]

Srivastava et al.

[11] Patent Number: 5,273,732
[45] Date of Patent: Dec. 28, 1993

[54] LUMINESCENT COMPOUNDS

[75] Inventors: Alok M. Srivastava, Schenectady, N.Y.; John F. Ackerman, Cheyenne, Wyo.

[73] Assignee: General Electric Company, Schenectady, N.Y.

[21] Appl. No.: 902,172

[22] Filed: Jun. 22, 1992

[51] Int. Cl.$^5$ .................... C01G 41/00; C09K 11/68
[52] U.S. Cl. .................. 423/464; 252/301.4 H; 252/301.5; 423/593
[58] Field of Search ............... 423/464, 593; 252/301.5, 301.4

[56] References Cited

U.S. PATENT DOCUMENTS 4,741,893  5/1988  Watanabe et al. ............ 423/464

OTHER PUBLICATIONS

Torardi et al. "Chem. Abstracts", vol. 102:176973h.
Wingefeld et al. "Chem. Abstracts", vol. 102:71669k.
Blasse et al. "Chem. Abstracts", vol. 101:200692t.

*Primary Examiner*—Jack Cooper
*Attorney, Agent, or Firm*—William H. Pittman

[57] ABSTRACT

Polymorphous phosphorescent compounds of the formula $MWO_2F_4$, wherein M is barium, strontium or lead, are prepared by the reaction of the appropriate metal tungstate with aqueous hydrofluoric acid. They have no electrons in the d orbital of the ground state, and therefore are useful in applications requiring phosphors with short primary decay times.

8 Claims, No Drawings

LUMINESCENT COMPOUNDS

This invention relates to new luminescent compositions of matter, useful as phosphors.

Phosphors are employed in such diverse applications as fluorescent lamps, television receivers, X-ray detection devices including computerized tomography scanners, digital radiography devices and positron emission tomography apparatus. Upon excitation by ultraviolet, X-ray or cathode radiation, they release energy in the form of light which may be easily detected.

For many areas of phosphor utilization including medical imaging systems, it is desired to have materials with short primary decay times. One way of reducing decay time is to formulate phosphors having no electrons in the d orbitals of the ground state. Various materials having this property are known. However, there is a continuing search for new phosphor materials with potential for utilization in systems of this type.

A number of phosphors satisfying this criteria are provided by the present invention. They are characterized by a polymorphous structure. That is, they exist in one crystalline form upon preparation, and are converted to another crystalline form when heated as described hereinafter. Both forms are luminescent.

In one of its aspects, the invention includes compounds having the formula $MWO_2F_4$, wherein M is barium, strontium or lead.

As will be apparent from the above generic formula, the compositions of this invention are oxyfluorides of tungsten in which the cationic species is a divalent ion selected from the group consisting of barium, strontium and lead. They may be prepared by the reaction of at least one tungstate having the formula $MWO_4$ with aqueous hydrofluoric acid solution, at temperatures up to about 125° C.

As formed, said compounds have a cubic crystal lattice. Upon heating to their melting points in an inert atmosphere such as nitrogen, they are converted to materials of identical stoichiometry having a hexagonal crystal structure. In the hexagonal form, they have luminescent properties identical to those of the cubic materials prepared at lower temperatures.

The preparation of the compounds of this invention is illustrated by the following examples.

EXAMPLE 1

Barium tungstate was dissolved in an excess of 25% (by weight) aqueous hydrofluoric acid solution and the mixture was heated to 100° C. It was allowed to cool, the supernatant liquid was poured off and the residual crystals of solid product were allowed to dry at room temperature. The product was the desired $BaWO_2F_4$, which luminesced intensely when exposed to ultraviolet light at a wavelength of 265 nm. The product had a cubic crystal lattice with the following X-ray diffraction pattern at room temperature:

| d | hkl | $I/I_{max} \times 100\%$ |
| --- | --- | --- |
| 6.5102 | 100 | 1.8 |
| 4.8224 | 101 | 11.2 |
| 3.6973 | 110 | 100.0 |
| 3.1950 | 200 | 69.3 |
| 2.9472 | 201 | 5.9 |
| 2.4216 | 210 | 29.8 |
| 2.3102 | 103 | 1.2 |
| 2.1423 | 300 | 20.9 |
| 2.0301 | 212 | 58.2 |
| 1.8574 | 302 | 21.8 |
| 1.7763 | 310 | 8.8 |
| 1.7354 | 213 | 2.8 |
| 1.6053 | 312 | 16.8 |
| 1.4732 | 402 | 25.1 |
| 1.4058 | 304 | 14.3 |
| 1.3730 | 411 | 11.1 |
| 1.2852 | 314 | 8.6 |
| 1.2408 | 006 | 7.0 |
| 1.2156 | 404 | 7.0 |
| 1.1712 | 332 | 5.8 |
| 1.1563 | 206 | 7.4 |
| 1.1054 | 333 | 3.9 |

Upon heating to 850° C. in a sealed platinum tube and cooling, the product was converted to one having a hexagonal crystal lattice and the following X-ray diffraction pattern at room temperature:

| d | hkl |
| --- | --- |
| 6.5102 | 100 |
| 4.8224 | 101 |
| 3.6973 | 110 |
| 3.1950 | 102 |
| 3.1950 | 200 |
| 2.9472 | 201 |
| 2.4216 | 202 |
| 2.3102 | 103 |
| 2.1423 | 300 |
| 2.0765 | 301 |
| 2.0301 | 212 |
| 1.8574 | 220 |
| 1.7763 | 104 |
| 1.7354 | 213 |
| 1.6053 | 400 |
| 1.4732 | 320 |
| 1.4058 | 410 |
| 1.3730 | 411 |
| 1.2852 | 500 |
| 1.2408 | 006 |
| 1.2408 | 330 |
| 1.2156 | 420 |
| 1.1712 | 332 |
| 1.1563 | 422 |
| 1.1054 | 512 |

EXAMPLE 2

The procedure of Example 1 is repeated, substituting strontium tungstate for the barium tungstate. A similar product having similar properties is obtained.

EXAMPLE 3

The procedure of Example 1 is repeated, substituting lead tungstate for the barium tungstate. A similar product having similar properties is obtained.

The compounds of this invention, being luminescent, are useful are phosphors in numerous types of lighting structures, medical diagnostic structures and the like, including those enumerated hereinabove. Accordingly, another aspect of the present invention is a phosphorescent article comprising a compound of this invention deposited on a substantially chemically inert support. Said support may be, for example, a material which is also inert to radiation (i.e., a glass envelope in the case of a fluorescent lamp fixture). In the case of a medical imaging apparatus, it may be a light sensing unit such as a photodiode, photomultiplier device or charge-coupled device.

What is claimed is:

1. A luminescent compound having the formula $MWO_2F_4$, wherein M is barium, strontium or lead, said compound having a hexagonal crystal structure.

2. A compound according to claim 1 wherein M is barium.

3. A compound according to claim 1 wherein M is strontium.

4. A compound according to claim 1 wherein M is lead.

5. A luminescent compound having the formula $MWO_2F_4$, wherein M is barium, strontium or lead, said compound having a cubic crystal structure.

6. A compound according to claim 5 wherein M is barium.

7. A compound according to claim 5 wherein M is strontium.

8. A compound according to claim 5 wherein M is lead.

* * * * *